April 18, 1967 — A. E. SCHRAEDER — 3,314,293
APPARATUS FOR MEASURING TEMPERATURE CHANGES IN STRIP METAL
Filed Jan. 10, 1964 — 2 Sheets-Sheet 1

INVENTOR.
ALBIN E. SCHRAEDER
BY
his ATTORNEY

April 18, 1967 A. E. SCHRAEDER 3,314,293
APPARATUS FOR MEASURING TEMPERATURE CHANGES IN STRIP METAL
Filed Jan. 10, 1964 2 Sheets-Sheet 2

INVENTOR.
ALBIN E. SCHRAEDER
BY
*J. R. Harris*
his ATTORNEY

3,314,293
APPARATUS FOR MEASURING TEMPERATURE CHANGES IN STRIP METAL
Albin E. Schraeder, Glassport, Pa., assignor to Jones & Laughlin Steel Corporation, Pittsburgh, Pa., a corporation of Pennsylvania
Filed Jan. 10, 1964, Ser. No. 336,966
5 Claims. (Cl. 73—355)

This invention relates to temperature measuring apparatus. It is more particularly concerned with apparatus for measuring changes in temperature of metallic strand moving continuously through a heat treating furnace.

My apparatus is specifically adapted for the measurement of changes in temperature of steel strip moving through a continuous strand annealing furnace, and will hereafter be described in that context. It is, however, useful for measuring changes in temperature of other metals in heating furnaces of various sorts, as will be understood by those skilled in the art from the description and explanation to follow.

A step now common in the production of steel strip is that of continuously annealing the strip by passing it in the form of strand through an elongated heating furnace in a non-oxidizing atmosphere. It is desirable to be able to measure automatically and with reasonable accuracy the temperature of the strip in the furnace, or at least changes in the temperature of the strip, so that those measurements can be used to maintain uniform annealing conditions. Since the strip is moving, its temperature cannot be determined by any contact device. The common practice is to provide the furnace with some type of radiation pyrometer which is sighted on the strip within. Because of the relatively low emissivity of steel strip and the relatively high temperatures of the furnace walls and roof, however, measurements obtained in the way above mentioned are useless for control purposes.

The deficiencies of such measurements can be easily demonstrated. The voltage output of a simple unshielded radiation pyrometer mounted as above described can be represented by the following equation:

$$R' = eS' + W' \qquad (1)$$

In Equation 1 and those to follow, unprimed upper case letters represent temperature, and primed upper case letters represent the voltage output of the radiation pyrometer sighted upon a blackbody of the temperature indicated by the corresponding unprimed letter. In Equation 1:

$R'$ is the radiation pyrometer output in microvolts.
$e$ is the strip emissivity.
$S'$ is the output in microvolts of the radiation pyrometer sighted upon a blackbody of the temperature S of the strip.
$W'$ is the background radiation level in microvolts.

The value of $S'$ must be obtained from the radiation pyrometer calibration furnished by its manufacturer or may easily be determined experimentally. Those values used in this description were obtained from the calibration of a Leeds and Northrup "Rayotube" Type 8890–A92–2409–24, and are tabulated in Table 1.

TABLE 1

*Blackbody microvolt-temperature values for "Rayotube" pyrometer*

| Microvolts, output: | Temperature, ° F. |
|---|---|
| 340 | 916 |
| 355 | 926 |
| 400 | 956 |
| 408 | 960 |
| 455 | 986 |
| 500 | 1011 |
| 625 | 1072 |
| 725 | 1114 |
| 900 | 1180 |
| 920 | 1188 |
| 980 | 1208 |

Consider the case in which the true strip temperature S is 956° F., the emissivity of the strip is 0.20, and the equivalent background temperature W is 1180° F. For the "Rayotube" above mentioned, $S' = 400$ microvolts,
$W' = 900$ microvolts,
$R' = (0.20 \times 400) + 900 = 980$ microvolts.

From the "Rayotube" calibration, 980 microvolts corresponds to 1208° F. The difference between the indicated and actual temperature, though great, is not in itself fatal, because the pyrometer output can be reduced to read the correct strip temperature, assuming that temperature had previously been determined in some other way. However, this is tantamount to attenuating the 980 microvolts pyrometer output to 400 microvolts. The attenuation factor $k$ is $400/980 = .408$. Equation 1, therefore, must be rewritten:

$$R' = k(eS' + W') \qquad (2)$$

Now consider the case in which the true strip temperature S increases from 956° F. to 1011° F. while other conditions remain unchanged. From the "Rayotube" calibration 1011° F. corresponds to 500 microvolts.

$$R' = .408((0.20 \times 500) + 900)$$

$R' = 408$ microvolts.

R from the "Rayotube" calibration = 960° F. An actual change of 55 Fahrenheit degrees in strip temperature has resulted in a change of only 4 degrees in indicated temperature.

If, now, the strip temperature S remains at 956° F. and the equivalent background temperature rises from 1180° F. to 1188° F. (900 to 920 microvolts), $$R' = .408((.020 \times 400) + 920)$$

$R' = 408$ microvolts
$R = 960°$ F.

Thus, a change in background level of only 8 degrees brings about the same change in indicated temperature as a change of 55 degrees in strip temperature. The unshielded radiation pyrometer is about seven times as sensitive to changes in background temperature as it is to changes in strip temperature.

It is an object of my invention, therefore, to provide non-contacting apparatus for measuring changes in temperature of metal strand moving through a heating furnace which is relatively sensitive to changes in strand temperature and relatively insensitive to changes in furnace temperature. It is another object to provide such apparatus which automatically compensates for changes in furnace temperature. It is another object to provide such apparatus which does not require a blackbody or other standard for comparison of signals. It is still another object to provide such apparatus which is itself maintained at relatively constant temperature by the externally generated atmosphere supplied to the furnace. Other objects of my invention will appear in the course of the description thereof which follows.

An embodiment of my invention presently preferred by me is shown in the attached figures to which reference is now made.

Figure 1:
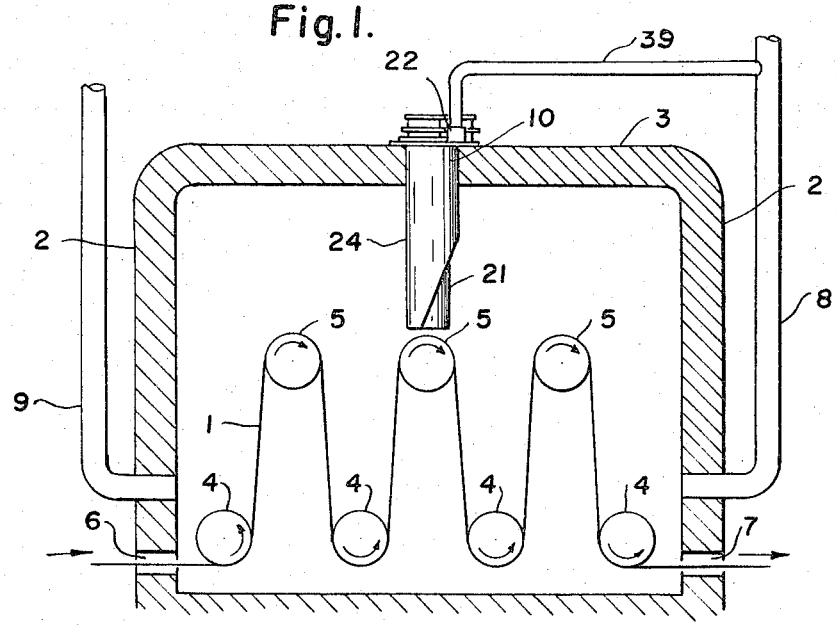
FIGURE 1 is a diagrammatic representation of a strand annealing furnace provided with apparatus of my invention.
Figure 2:
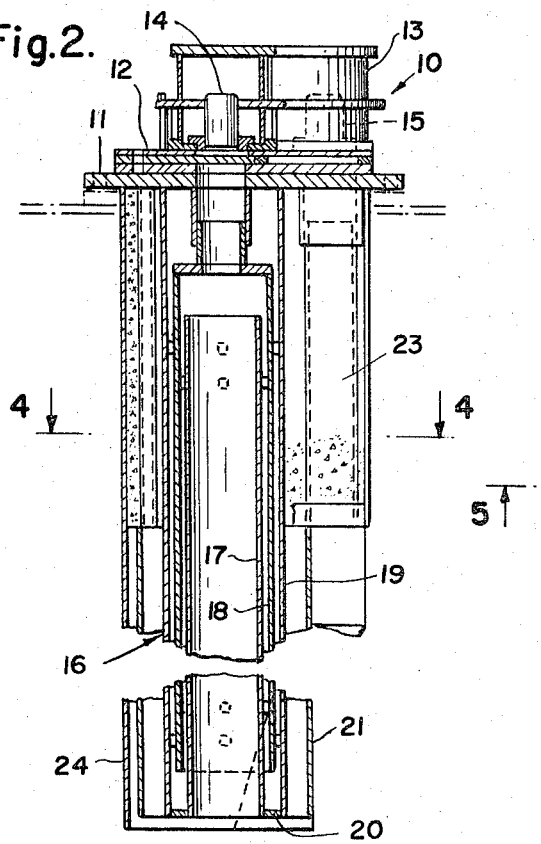
FIGURE 2 is an elevation, in section, of the temperature sensing assembly.
Figure 3:
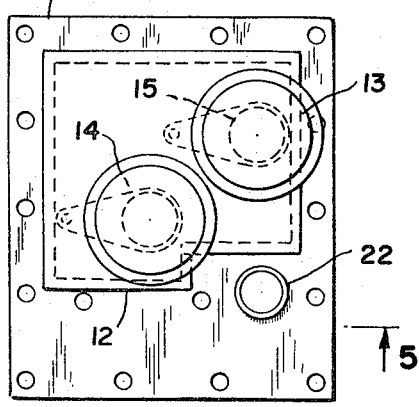
FIGURE 3 is a plan view of the apparatus of FIGURE 2.
Figure 4:
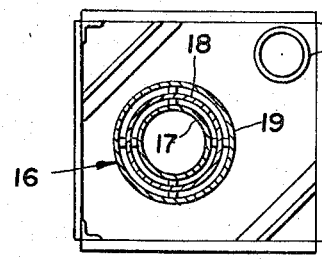
FIGURE 4 is a horizontal section of the apparatus of FIGURE 2 taken on the plane 4—4.
Figure 5:
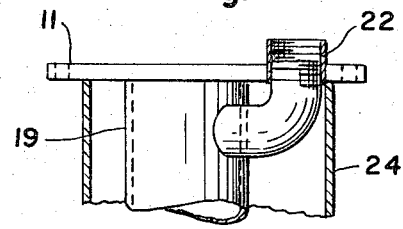
FIGURE 5 is a vertical section of a portion of the apparatus of FIGURE 3 taken on the plane 5—5.

A furnace chamber formed by walls 2—2 and a roof 3 is provided with a plurality of bottom rolls 4—4 positioned parallel to each other and a plurality of top rolls 5—5 arranged in the same way and parallel to rolls 4—4. Strip 1 is threaded under rolls 4—4 and over rolls 5—5 in a series of loops. The strip 1 enters the furnace through a door 6 in one wall 2 and leaves the furnace through a door 7 in the opposite furnace wall. One furnace wall 2 is provided with a conduit 8 for introducing a controlled atmosphere and another wall 2 is provided with a conduit 9 for exhausting the furnace atmosphere. In the roof 3 is mounted a temperature sensing assembly 10 which is shown in detail in FIGURES 2 through 5. The furnace chamber is heated by conventional means which are not shown.

Assembly 10 is mounted on a normally horizontal plate 11. On the upper surface of plate 11 are fastened spaced housings 12 and 13 within which are positioned pyrometers 14 and 15 respectively. Beneath housing 12 and attached to the lower surface of plate 11 is a shielding assembly 16 comprising a vertically disposed inner shield or duct 17, a larger diameter intermediate duct 18 enclosing duct 17, and a still larger diameter outer duct 19 enclosing ducts 17 and 18. The three shields or ducts are coaxially positioned so as to provide annular spaces between ducts 17 and 18, and ducts 18 and 19 respectively. The top end of duct 18 is closed to plate 11 and the open top end of duct 17 is spaced below the top end of duct 18. The top end of duct 19 is closed to plate 11. The space between the bottom ends of ducts 17 and 19 is closed by a plate 20. The bottom end of duct 18 is spaced above plate 20. Radiation pyrometer 14 is sighted through duct 17. Duct 19 is provided with an inlet connection 22 which is connected by pipe 39 to conduit 8. Assembly 16 is enclosed by thermal insulation which is in turn enclosed by a metal sheath 21. The entire structure of pyrometer assembly 10 inside the furnace is protected by a mechanical shield 24.

Beneath housing 13 and attached to the lower surface of plate 11 is a vertically disposed sight tube 23. Radiation pyrometer 15 is sighted through tube 23. Assembly 10 is mounted in the furnace roof 3 so that both pyrometers 14 and 15 are sighted on the strip 1 where it passes over a top roll 5.

Figure 6:
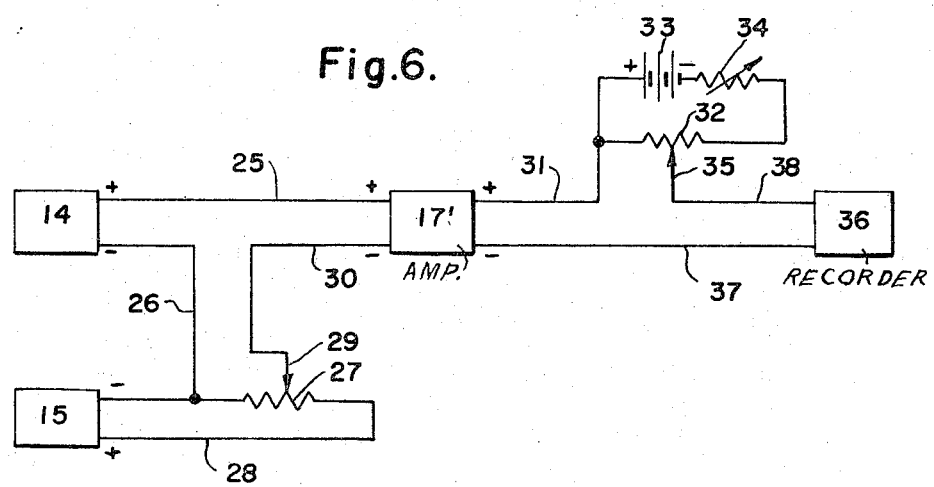
FIGURE 6 is a block schematic diagram of the electrical connections of my apparatus.

The electrical connections of radiation pyrometers 14 and 15 and other elements of my apparatus to be described are shown in FIGURE 6. The positive terminal of pyrometer 14 is connected by a conductor 25 to the positive input terminal of a direct current amplifier 17′. The negative terminal of pyrometer 14 is connected to the negative terminal of pyrometer 15 by conductor 26 which also is connected to one end of potentiometer 27. The other end of potentiometer 27 is connected by conductor 28 to the positive terminal of pyrometer 15. The slider 29 of potentiometer 27 is connected by conductor 30 to the negative input terminal of amplifier 17′. The positive output terminal of amplifier 17′ is connected by conductor 31 with one end of potentiometer 32 and with the positive terminal of battery 33. The negative terminal of battery 33 is connected to one end of a resistor 34, the other end of which is connected to the other end of potentiometer 32. The slider 35 of potentiometer 32 is connected by a conductor 38 to one terminal of an indicator or recorder 36 and the other terminal of that indicator is connected by conductor 37 to the negative terminal of amplifier 17′.

It will be apparent from the foregoing description of the circuit of FIGURE 6 that the output voltages of pyrometers 14 and 15 oppose each other. The potentiometer 27 permits the selection of an appropriate portion of the output voltage of pyrometer 15 to oppose the output voltage of pyrometer 14. In a like manner, a portion of the voltage provided by battery 33 opposes the output voltage of amplifier 17′ and that portion can be varied by the use of potentiometer 32.

The operation of my apparatus is most readily understood by deriving the equation of the output of pyrometer 14 which is shielded by subassembly 16 from direct radiation from the furnace walls and partially shielded from radiation reflected by strip 1 from the furnace walls. The equation is an expansion of Equation 1, as follows:

$$R' = eS' + fW' + A' \qquad (3)$$

where $f$ is the ratio of the extraneous radiation entering pyrometer 14 when the shield of subassembly 16 is employed to that which would enter the pyrometer in the absence of that shield and where $A'$ is a function of both shield temperature and the reflectivity of the strip 1. The other symbols have the same significance as in Equation 1. It happens that the reflectivity of continuously annealed steel strip is practically constant over the range of annealing temperatures. Therefore, if the shield subassembly 16 is held at a constant temperature, $A'$ will be a constant voltage.

If Equation 3 is rearranged to furnish values of $S'$, it becomes $$S' = 1/e(R' - fW' - A') \qquad (4)$$

It is seen that a voltage representing the temperature of strip 1 can be obtained by subtracting from the output voltage of pyrometer 14 a voltage proportional to the background signal level $W'$ and a constant voltage $A'$, and multiplying the result by a gain factor $1/e$ which takes into account the strip emissivity. The constants $f$ and $A'$ must be determined experimentally.

The background radiation level $W'$ is obtained from pyrometer 15. I prefer to sight pyrometer 15 on the moving strip 1 itself. Clear steel strip is of low emissivity and the background radiation is high compared with the energy radiated by the strip itself. I find that the output of pyrometer 15 is much more closely related to furnace wall temperature than it is to the strip temperature. Alternatively, however, pyrometer 15 can be sighted on a stationary reference target of low emissivity which is maintained at a constant temperature. Potentiometer 27 is adjusted to select the ratio $f$.

The voltage $A'$ is obtained from battery 33 by choice of resistor 34 and variation of potentiometer 32.

As the difference between the output voltages of pyrometer 14 and 15 is rather small, I raise it by use of an amplifier 17′ shown in FIGURE 6. If the gain of amplifier 17' is represented by $g$, Equation (4) may be rewritten with that constant as follows:

$$S' = 1/ge(g(R' - fW') - gA') \quad (5)$$

The circuit of FIGURE 6 represents in effect a simple analog computer which converts inputs $R'$ and $W'$ from pyrometers 14 and 15 respectively to a true strip temperature readout if the three compensating elements are properly adjusted. Potentiometer 27 compensates for background radiation, potentiometer 32 for shield radiation, and the gain $1/ge$ of amplifier 17' for strip emissivity.

As I have mentioned, the emissivity of continuously annealed steel strip is 0.20. I find 20 to be a convenient figure for $g$, the gain of amplifier 17'. The component of radiation $A'$ due to the shield itself as here described and illustrated is about 75 microvolts.

The shielding factor $f$ is of the order of 0.05. An error in determining the value of $f$ will affect the absolute accuracy of temperature reading of my apparatus, but within rather wide limits will not substantially affect its measurement of temperature differences, as is easily shown. Assume the following operating conditions:

$R' = 200$ microvolts
$W' = 900$ microvolts
$A' = 75$ microvolts
$f = 0.05$
$e = 0.20$ Then $S'$ in Equation (4) is $$S' = 5(200 - (0.05)(900) - 75)$$

$S' = 400$ microvolts
$S = 956°$ F.

If the shielding factor is erroneously determined to be 0.06, $S' = 355$ microvolts
$S = 926°$ F.

The erroneous determination of the shielding factor has brought about an error of 30° F. in the absolute temperature indication. However, suppose that S increases from 956° F. to 1011° F. It can be shown from Equation 3 that this is tantamount to an increase in $R'$ from 200 to 220 microvolts. If $f$ equals 0.05, and all other constants are unchanged, $$S' = 5(220 - (0.05)(900) - 75)$$

$S' = 500$ microvolts
$S = 1011°$ F.

If, on the other hand, $f = .06$ $$S' = 5(220 - (.06)(900) - 75)$$

$S' = 455$ microvolts
$S = 986°$ F.

This reading is less than the true temperature 1011° F. by 25° F. That error, however, is only 5° less than the error in the temperature indicated to be 926° F. with the same erroneous shielding factor $f$. In other words, when the shielding factor is determined to be 0.06, the indicated temperature difference is 60° F. as opposed to a true temperature difference to 55° F. when the correct shielding factor is used. Therefore, my apparatus is quite sufficiently accurate in this respect for control purposes.

It can be shown in the same way that if the shielding factor is taken to be 0.10 instead of 0.05, the strip temperature of 956° F. will be indicated to be 785° F., and the strip temperature of 1011° F. will be indicated to be 870° F. The absolute error in each case is considerable, and the true 55° difference in temperatures is indicated to be 85° F. If, on the other hand, the shielding factor is taken to be 0, the strip temperature of 956° F. will be indicated to be 1072° F., and the strip temperature of 1011° F. will be indicated to be 1114° F. The absolute temperatures are each more than 100° higher than the true strip temperatures, but the difference in indicated temperatures is 42° F. rather than the true difference of 55° F. Therefore, if the shielding factor cannot be accurately determined, it is preferable to undercompensate rather than to overcompensate. Even without any background compensation, my apparatus is quite sensitive to differences in strip temperature.

In a similar way the combined effects of inexact background compensation and changes of background radiation can be shown. At a constant strip temperature, say of 956° F., the background level $W'$ can vary from perhaps 600 microvolts to 1200 microvolts. If $W'$ is taken as 900 microvolts, $R'$ can be obtained from Equation 3 as follows:

$$R' = (0.2)(400) + (0.05)(900) + 75$$

$R' = 200$ microvolts.

If $W' = 1200$ microvolts, $$R' = 80 + (0.05)(1200) + 75$$

$R' = 215$ microvolts.

If the background compensator is erroneously set at 0.06 instead of 0.05, then, from Equation 4, when $R' = 200$ microvolts, $$S' = 5(200 - 54 - 75)$$

$S' = 355$ microvolts
$S = 926°$ F. (30° error)

When $R' = 215$ microvolts, $$S' = 5(215 - 72 - 75)$$

$S' = 340$ microvolts
$S = 916°$ F. (40° error)

Thus, the change in background level of 300 microvolts at constant strip temperature brings about an undesired change in indicated temperature of only 10°. For a compensator setting of 0.04 instead of 0.05 the corresponding change can be shown to be only 8°. Again, it is seen to be preferable to set the background compensator on the low rather than the high side where there is doubt as to its exact setting.

In the same way as above, it can be shown that errors in compensation for the emissivity of the strip can cause errors in the absolute temperature readings, but that the difference between two such temperature readings is not greatly affected. The same is true of errors in determination of the constant $A'$.

It is desirable that the shield assembly 16 be held at a relatively low temperature. When the temperature of that assembly is around 1000° F., the pyrometer 14 is about ten times as sensitive to changes in temperature of the shield assembly 16 as it is when that assembly is at a temperature of about 500° F. I find that the temperature of assembly 16 can be held at a desirably low temperature if it is cooled by a flow of gas. As strand annealing furnaces for steel strip are conventionally supplied with an atmosphere of non-oxidizing gas, I supply part of that atmosphere to the furnace through assembly 16. As is shown in FIGURE 1, a pipe 39 connects the furnace atmosphere inlet conduit 8 to inlet connector 22 of shield assembly 16. A portion of the externally generated furnace atmosphere is supplied through connector 22 to the interior of duct 19. It passes downwardly in the annular space between ducts 19 and 18, then upwardly in the annular space between ducts 17 and 18, over the top of duct 17, and finally down through duct 17 into the furnace. This flow of gas over the surface of ducts 17, 18 and 19 continuously cools them.

In the circuit of FIGURE 6 adjustment of gain $1/ge$ of amplifier 17' to compensate for strip emissivity requires a corresponding readjustment of potentiometer 32. It is therefore more convenient in practice to use a fixed gain amplifier 17' and a recorder 36 with a conventional span adjustment. The span adjustment is then varied to compensate for strip emissivity.

I claim:

1. Apparatus for measuring changes in temperature of strand moving through a furnace comprising a first radiation pyrometer sighted on the strand, shielding means surrounding the sight path from the first pyrometer to the strand but stopping short of the strand and adapted to minimize impingement on the first pyrometer of direct radiation from the furnace walls and radiation reflected from the strand, a second radiation pyrometer sighted on a reference surface of low emissivity so as to receive substantially more radiation reflected from the furnace walls than the first radiation pyrometer, means for obtaining a predetermined fraction of the electrical output of the second pyrometer, and means for indicating the electrical output of the first pyrometer less the predetermined fraction of the electrical output of the second pyrometer.

2. The apparatus of claim 1 in which the reference surface is the strand.

3. The apparatus of claim 1 including a source of adjustable bucking voltage in series with the output of the pyrometers and the indicating means adjusted to provide a voltage equal to the component of the output voltage of the first pyrometer contributed by radiation from the shielding means.

4. The apparatus of claim 3 in which an amplifier is connected between the output of the pyrometers and the source of adjustable bucking voltage the amplifier being adjusted to provide a gain inversely proportional to the emissivity of the strand.

5. Apparatus for measuring the temperature of work in a furnace provided with means for supplying a controlled atmosphere thereto comprising a radiation pyrometer sighted on the work, a plurality of concentric shields surrounding the sight path and spaced from each other, means for supplying at least a portion of the controlled atmosphere as a cooling gas to the shield, and means for causing the cooling gas to travel through the spaces between the shields to maintain the shields at constant temperature.

References Cited by the Examiner
UNITED STATES PATENTS

| | | | |
|---|---|---|---|
| 2,020,019 | 11/1935 | Collins et al. | 73—355 X |
| 2,184,169 | 12/1939 | Sordahl. | |
| 2,386,831 | 10/1945 | Wright | 250—83.3 X |
| 2,565,249 | 8/1951 | Machler | 73—355 |
| 2,737,809 | 3/1956 | Fastie | 73—355 |
| 3,045,487 | 7/1962 | Rawzer | 73—359 X |
| 3,161,771 | 7/1964 | Engborg | 73—355 X |

LOUIS R. PRINCE, *Primary Examiner.*

S. H. BAZERMAN, F. SHOON, *Assistant Examiners.*